(12) United States Patent
Leuca et al.

(10) Patent No.: US 6,687,374 B2
(45) Date of Patent: Feb. 3, 2004

(54) MULTI-SERVICE NETWORK INTERFACE FOR FDM COMMUNICATIONS SYSTEMS

(75) Inventors: Ileana A. Leuca, Bellevue, WA (US); Keith C Nichols, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 97 days.

(21) Appl. No.: 09/879,358

(22) Filed: Jun. 12, 2001

(65) Prior Publication Data

US 2002/0186836 A1 Dec. 12, 2002

(51) Int. Cl.[7] .............................. H04M 1/00; H04M 9/00
(52) U.S. Cl. ............................ 379/413.04; 379/399.01; 379/413.02; 379/413.03
(58) Field of Search ....................... 379/399.01, 399.02, 379/413.02–413.04

(56) References Cited

U.S. PATENT DOCUMENTS

| | | | |
|---|---|---|---|
| 4,817,132 A | | 3/1989 | Chamberlin et al. |
| 5,781,617 A | | 7/1998 | McHale et al. |
| 5,903,643 A | | 5/1999 | Bruhnke |
| 5,978,684 A | | 11/1999 | Cook et al. |
| 6,118,777 A | * | 9/2000 | Sylvain |
| 6,169,788 B1 | * | 1/2001 | McHale et al. |
| 6,363,079 B1 | * | 3/2002 | Barzegar et al. |
| 6,396,911 B1 | * | 5/2002 | Kostan et al. |

FOREIGN PATENT DOCUMENTS

| | | |
|---|---|---|
| WO | WO 98 02985 | 1/1998 |
| WO | WO 00 31922 | 6/2000 |

* cited by examiner

Primary Examiner—Forester W. Isen
Assistant Examiner—Ramnandan Singh
(74) Attorney, Agent, or Firm—Perkins Coie LLP

(57) ABSTRACT

Apparatuses and methods for selectively coupling the signals of multiple communications service providers operating in different frequency bands onto one or more station wire segments of a customer premises wiring plant are disclosed herein. The apparatus can include various filtering networks and switching modules to enable each station wire segment of the premises wiring to be concurrently and independently connected to differing service providers.

8 Claims, 1 Drawing Sheet

MULTI-SERVICE NETWORK INTERFACE FOR FDM COMMUNICATIONS SYSTEMS

FIELD OF THE INVENTION

The present invention relates generally to an interface device and method that enables a customer premises to receive services from a plurality of communications service providers, and more particularly, to an interface which permits a customer premises to receive local loop analog POTS service from multiple service providers (e.g., LEC, coax cable, wireless, DSL, etc.) by selectively connecting all or a segment of the POTS inside wiring plant to one of those services while concurrently maintaining an uninterrupted connection to a Frequency-Division-Multiplexed (FDM) service, such as a Fixed Wireless High Speed Data (HSD) service, on the same segment(s) of the same POTS inside wiring plant.

BACKGROUND

U.S. Pat. No. 5,903,643 entitled "Multi-line Station Interface" discloses a switchable interface device that enables a user to selectively connect a first of several service providers to one or more premises stations, and concurrently connect a second of the several service providers to one or more premises station locations, where the second group of one or more premises stations are necessarily different from the first group. The system disclosed in the '643 Patent does not permit a concurrent connection between a given station set (i.e., the inside wiring run) and the analog POTS service from a first service provider while allowing a connection to a FDM overlaid service (Fixed Wireless HSD, for example) from a second service provider.

U.S. Pat. No. 4,817,132 entitled "Multi-Line Access Module for Telephone Set" discloses a similar, although simpler, switching interface device to the one disclosed in the '643 Patent. A switching module is shown and described, which allows single-line telephones to be selectively switched among a multiplicity of incoming POTS CO lines from the service provider. No provision is made for coupling or switching of FDM overlaid services independent of the selected analog POTS service provider.

Several competitive, as well as complimentary voice and data communication technologies are available to subscribers for potentially concurrent distribution and usage within the customer premises. These include alternative local loop services, such as AWS Fixed wireless, voice and data over coaxial cable and various splitterless DSL services. For a variety of reasons many customers will elect to subscribe to multiple concurrent services. It is highly desirable to enable distribution of one or more of these voice and data services throughout the customer premises by utilizing the existing inside wiring plant as the common transmission medium, thus eliminating the need to install new, independent wiring and duplicate telephone stations for each of the subscribed services. Additionally, the common wiring plant may be utilized for a local area network (LAN) which may operate as an "always-connected" service. One currently available technology for distributing communications signals over the existing POTS inside wiring plant is the HomePNA 1.0 technology as specified by the Home Phoneline Networking Alliance. The HomePNA technology operates as a high-frequency, Frequency-Division-Multiplexed communication system which allows concurrent usage of the POTS service operating on the same wires. The HomePNA (or similar) technology may be utilized to distribute the signals of one of several alternative service providers throughout the premises inside wiring plant. A subscriber may have several concurrent local POTS service subscriptions (LEC line; Fixed Wireless, etc.) as well as one or more broadband data service subscriptions (splitterless DSL; Cable Modem; Fixed Wireless Data; etc.). A customer may also desire to alternate between two or more currently subscribed always-on data services, such as splitterless DSL, Cable and Fixed Wireless in a manner independent of the currently-selected POTS service provider.

It is possible for a subscriber having multiple POTS local loop service providers to utilize a Multi-line Station Interface switching device (such as disclosed in the '643 Patent) to selectively connect all or part of the premises station wiring to one of several POTS or other base band service providers. The system disclosed in the '643 Patent does not allow a HSD customer to maintain a LEC local loop line for use with a dial-up modem while maintaining an uninterrupted connection to the HSD service. The customer would be disconnected from HSD service when switching the electrical connection on the inside wiring to the LEC line.

SUMMARY OF THE INVENTION

In view of the above, it is an object of the present invention to provide a multi-service communications interface device which selectively couples the signals of one or more communications service providers, operating in one or more frequency bands higher than, and not overlapping, the conventional POTS telephone service frequency band, onto one or more station wire segments of the customer premises wiring plant in a manner not dependent on the hard-wired or switch-selectable interconnection of one or more POTS service provider connections to the same premises wiring plant station wire segments.

It is another object of the invention to provide an interface device that permits the concurrent connection to a POTS band service from a first service provider while maintaining, in an uninterrupted manner, an always-on connection to a FDM overlaid service from a second service provider with both services sharing the common inside wiring plant.

It is yet another object of the present invention to provide an interface device that permits the concurrent connection to a POTS band service from a first service provider while allowing the subscriber to selectively switch among a multiplicity of FDM overlaid services from a multiplicity of service providers with both selected services concurrently sharing the common inside wiring plant.

In accordance with the above objects and additional objects that will become apparent hereinafter, the interface device comprises one or more service access modules, each including, in part, a high-pass, or band-pass, and low-pass filter network collectively connected, on one side, to a service provider's signal connection demarcation point and, on the other side, separately connected to high-band and low-band interface switching devices. A first of the one or more service access modules is connected to a first communications service provider and the additional service access module are in respective communication with additional service providers. One or more station access modules are provided for establishing communication between the interface switching devices and one or more customer station connection points within the premises inside wiring plant, each of the station access modules optionally consisting, in part, of a high-pass (or band-pass) and low-pass filter network corresponding in pass-bands to the coupling filter network of the service access module(s) to which a service connection is desired. Two, or more, cross-point bus switching devices are provided for selectively connecting band-separated signals between any of the service access modules and any one, or group, of station access modules under the control of a control device. Thus, any premises station wire segment may be concurrently and independently connected to any one of a multiplicity of low-band (e.g., POTS) services and high-band (e.g., HomePNA; DSL) services provided to the premises by multiple service providers.

In accordance with the invention, there is also provided a method for selectively coupling the signals of a plurality of communications service providers operating in different frequency bands higher than and not overlapping the conventional POTS frequency band, onto one or more station wire segments of a customer premises wiring plant. The method comprises the steps of filtering signals received from each of the one or more communications service providers in a filter network comprising at least one of a high-pass (or band-pass) filter, and a low-pass filter; and selectively communicating filtered signals from each communications service provider to each station wire segment of the customer premises wiring plant. The method enables each premises station wire segment to be concurrently and independently connected to low-band and high-band service providers.

The present invention will now be described with particular reference to the accompanying drawings.

DETAILED DESCRIPTION OF THE PREFERRED EMBODIMENTS

Figure 1:
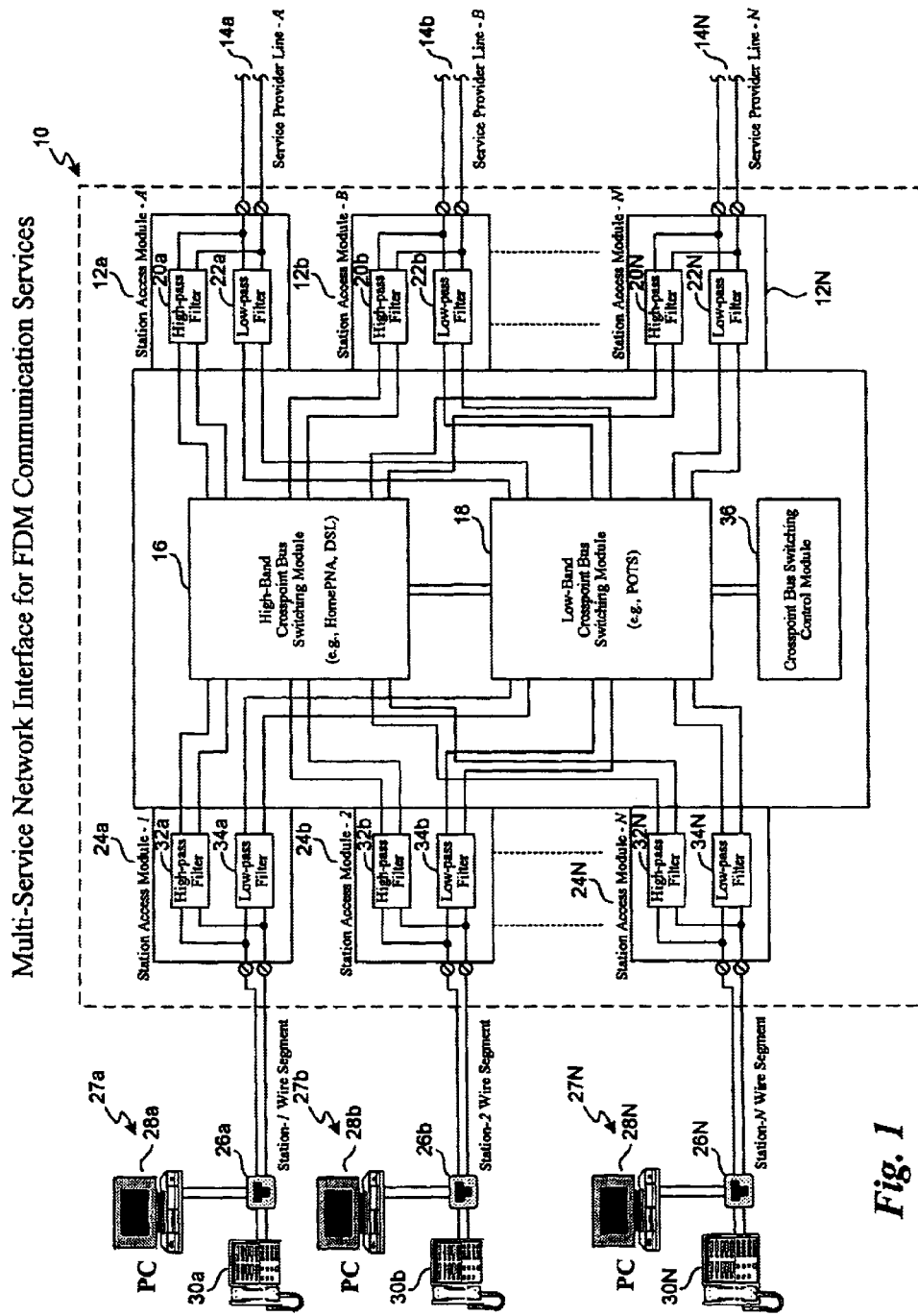
FIG. 1 is a schematic of an interface device for FDM communication services.

With reference now to the drawings, FIG. 1 depicts a multi-service network interface for frequency-division multiplexed communications, the interface generally characterized by the reference numeral 10. The network interface generally comprises at least one service access module 12a, 12b . . . 12n. Each service access module (12a–n) is connected to a respective service provider's signal demarcation point 14a, b . . . n. The service access module 12a–n is also respectively connected to interface switching devices including a high-band cross-point bus switching module 16 and a low-band cross-point bus switching module 18 described further below. Each service access module includes a filter network comprising a high-pass (or band-pass) filter 20a, 20b . . . 20n, and a low-pass filter 22a, 22b . . . 22n, each filter having inputs respectively coupled to the service provider's signal demarcation point (14a–n). Each high-pass filter 20a . . . n has an output to the high-band switching module 16 and each low-pass filter 22a . . . n has an output to the low-band switching module 18.

The interface 10 further comprises at least one station access module 24a, 24b . . . 24n, for establishing communication between the interface switching devices and one or more customer station connection points 26a, 26b . . . 26n, respectively. The customer station connection points 26a–n are coupled, in the illustrative application, to a network access device such as a home computer (PC) 28a, 28b . . . 28n and a telephone 30a, 30b . . . 30n, collectively forming customer stations 27a, 27b . . . 27n. The station access module has a filter network comprising a high-pass (or band-pass) filter 32a, 32b . . . 32n, and low-pass filter 34a, 34b . . . 34n, corresponding in pass-bands to the coupling filter network of the service access modules 12a–n to which a service connection is desired. The high-(or band-) pass filter 32a . . . n is connected to the output of the high-band switching module 16, and the low-pass filter 34a . . . n is connected to the output of the low-band switching module 18.

The respective high-band and low-band switching modules 16 and 18, selectively connect band-separated signals between any of the service access modules 12a–n and any one or a group of station access modules 24a–n. A control module 36 is coupled to the high- and low-band switching modules 16, 18 to control the manner in which the signals are routed between the service access modules 12a–n and the station access modules 24a–n. The control module 36 may be configured with a suitable interface to enable a customer to select the station and associated peripherals to be coupled to a desired service provider. The control module 36 can be programmed to provide an independent connection from any of the communications service providers 14a, 14b . . . 14n to the station wire segments 26a, 26b . . . 26n. The control module also enables a concurrent connection between any premises station wire segment and a plurality of low-band (e.g., POTS) services and high-band (e.g., HomePNA, DSL, etc.) services provided to the customer premises by a plurality of service providers. For example, station 27a can be provided with a high-band communications service (e.g., DSL) supplied via connection 14a and a low-band communications service provided on connection 14b. The high-band service on 14a is passed to the high-band switching module 16 and the low-band service on 14b is communicated to the low-band switching module 18. The control module 36 signals the switching modules 16 and 18, respectively, to send the high-band signals from 14a and the low-band signals from 14b to the station access module 24a. The high-pass filter 32a in the station access module 24a is matched in pass-bands to the high-pass filter 20a in the service access module, 12a thereby enabling the high-band service from 14a to be connected to the station wire segment 26a of station 27a. Similarly, the low-band service from 14b is directed via the switching module 16 to the station access module 24a. The low-pass filter 34a is matched in pass-bands to the low-pass filter 22b in the service access module 12b, such that the low-band service from 14b is connected to the station wire segment 26a of station 27a. The matched filter network between the station access module 24a and the service access module 12a permits the customer to receive concurrent high-band and low-band services.

The interface 10 enables the customer premises to receive local loop analog POTS from multiple service providers (e.g., LEC, coax cable, wireless, DSL, etc.) and selectively connect all or a segment of the POTS inside wiring plant to one of those services while concurrently maintaining an uninterrupted connection to a FDM service, such as, for example, a Fixed Wireless HSD service, on the same segment(s) of the same POTS inside wiring plant, thereby eliminating the need for independent inside wiring corresponding to each of the services. In an illustrative example of a Fixed Wireless voice/HSD service, one benefit of the invention permits a HSD customer to maintain a LEC local loop line for use with a dial-up modem while maintaining the full-time uninterrupted connection to the HSD service on the inside wiring. Other applications include the isolation of multiple high-frequency overlay services (e.g., VDSL and HomePNA) that share overlapping and conflicting portions of frequency band. The present invention can be utilized as a filter to isolate multiple services on different inside wiring segments, as well to shield the wire segments from the egress EMF of another service provider's line.

The present invention has been shown and described in what is considered to be the most practical and preferred embodiment. It is anticipated, however, that departures may be made therefrom and that obvious modifications will be implemented by those skilled in the art.

We claim:

1. An apparatus for use at a customer premise for selectively coupling the signals of each of multiple communications service providers, each operating in different frequency bands, onto one or more station wire segments of a customer premises wiring plant, comprising:

a plurality of service access modules, each of the service access modules including a filter network connected to a respective communications service provider's signal;

a high-band cross-point bus switching module connected to each service access module;

a low-band cross-point bus switching module connected to each service access module; and at least one station access module connected to the high-band cross-point bus switching module and the low-band cross-point bus switching module, the station access module connected to a station wire segment of the customer premises wiring plant, the station access module including a filter network to selectively couple to receive signals from any one of the multiple communication service providers.

2. The multi-service interface device recited in claim 1, wherein the service access module filter network includes at least one of a high-pass or band-pass filter, and a low-pass filter.

3. The multi-service interface device recited in claim 2, wherein the station access module includes at least one of a high-pass or band-pass filter and a low-pass filter corresponding in pass-bands to the service access module filter network.

4. An apparatus for use at a customer premise for selectively coupling the signals of each of multiple communications service providers, each operating in different frequency bands, onto one or more station wire segments of a customer premises wiring plant, comprising:

a plurality of service access modules, each of the service access modules comprising a filter network including at least one of a high-pass or band-pass filter, and a low-pass filter connected to a respective communications service provider's signal;

a high-band cross-point bus switching module connected to each service access module;

a low-band cross-point bus switching module connected to each service access module; and at least one station access module connected to the high-band cross-point bus switching module and the low-band cross-point bus switching module, the station access module including at least one of a high-pass or band-pass filter and a low-pass filter corresponding in pass-bands to the service access module filter network, and connected to a station wire segment of the customer premises wiring plant, the station access module including a filter network to selectively couple to receive signals from any one of the multiple communication service providers.

5. A method for use at a customer premise, of selectively coupling the signals of each of multiple communications service providers, each operating in different frequency bands, onto one or more station wire segments of a customer premises wiring plant, comprising:

filtering signals from each communications service provider; and selectively communicating the filtered signals from each communications service provider to each station wire segment of the customer premises wiring plant, whereby, each premises station wire segment may be concurrently and independently connected to service providers operating in different frequency bands and may selectively receive signals from any one of the communication service providers.

6. The method of claim 5, wherein the filtered signals from each communications service provider are selectively communicated to a filter network coupled to each premises station wire segment.

7. The method of claim 6, wherein the filtered signals from each communications service provider are passed through a high-band cross-point bus switching module and a low-band cross-point bus switching module, the high- and low-band switching modules operable to selectively communicate the filtered signals from each communications service provider to the station access module filter networks.

8. A method for use at a customer premise, of selectively coupling the signals of each of multiple communications service providers, each operating in different frequency bands, higher than and not overlapping the conventional POTS frequency band, onto one or more station wire segments of a customer premises wiring plant, comprising:

at least one of high-pass or band-pass, and low-pass filtering signals received from each of the one or more communications service providers; and selectively communicating filtered signals from each communications service provider to each station wire segment of the customer premises wiring plant, whereby, each premises station wire segment may be concurrently and independently connected to low-band and high-band service providers and may selectively receive signals from any one of the communication service providers.

* * * * *